US006801500B1

(12) United States Patent
Chandran

(10) Patent No.: US 6,801,500 B1
(45) Date of Patent: Oct. 5, 2004

(54) METHOD AND APPARATUS FOR PROVIDING RESERVED RATES TO MULTIPLE FLOWS ON A NETWORK INTERFACE

(75) Inventor: Kartik Chandran, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/574,638

(22) Filed: May 18, 2000

(51) Int. Cl.[7] .................................................. H04L 5/12
(52) U.S. Cl. ............................. 370/230.1; 370/235.1; 370/395.21
(58) Field of Search ........................ 370/230.1, 235–240, 370/232, 233, 234, 389, 235.1, 236.1, 450, 395.21

(56) References Cited

U.S. PATENT DOCUMENTS

| 5,289,462 | A | * | 2/1994 | Ahmadi et al. | 370/232 |
| 5,596,576 | A | * | 1/1997 | Milito | 370/450 |
| 5,625,622 | A | * | 4/1997 | Johri | 370/235.1 |
| 6,167,027 | A | * | 12/2000 | Aubert et al. | 370/230 |
| 6,538,989 | B1 | * | 3/2003 | Carter et al. | 370/229 |
| 6,578,082 | B1 | * | 6/2003 | Ho et al. | 709/233 |
| 6,611,522 | B1 | * | 8/2003 | Zheng et al. | 370/395.21 |

OTHER PUBLICATIONS

Rexford et al., "A Scalable Architecture for Fair Leaky–Bucket Shaping", IEEE, 1997.*
Bennett et al., "Worst–case Fair Weighted Fair Queuing", IEE, 1996.*
Golestani, S. J., "A Self–Clocked Fair Queuing Scheme for Broadband Applications", IEEE, 1994.*
Rexford et al., "Scalable Architectures for Integrated Traffic Shaping and Link Scheduling in High–Speed ATM Switches", IEEE, 1997.*
"An Engineering Approach to Computer Networking," Addison Wesley Longman, S. Keshav (1997).

* cited by examiner

Primary Examiner—Afsar Qureshi
(74) Attorney, Agent, or Firm—Beyer Weaver & Thomas, LLP

(57) ABSTRACT

The disclosed system provides management of multiple flows at a network device interface such as a router interface to assure maximum usage of the bandwidth available on the physical line while guaranteeing minimum reserved rates for individual flows. It accomplishes this by monitoring usage of a peak rate and a reserved rate for each data flow handled by the interface.

39 Claims, 8 Drawing Sheets

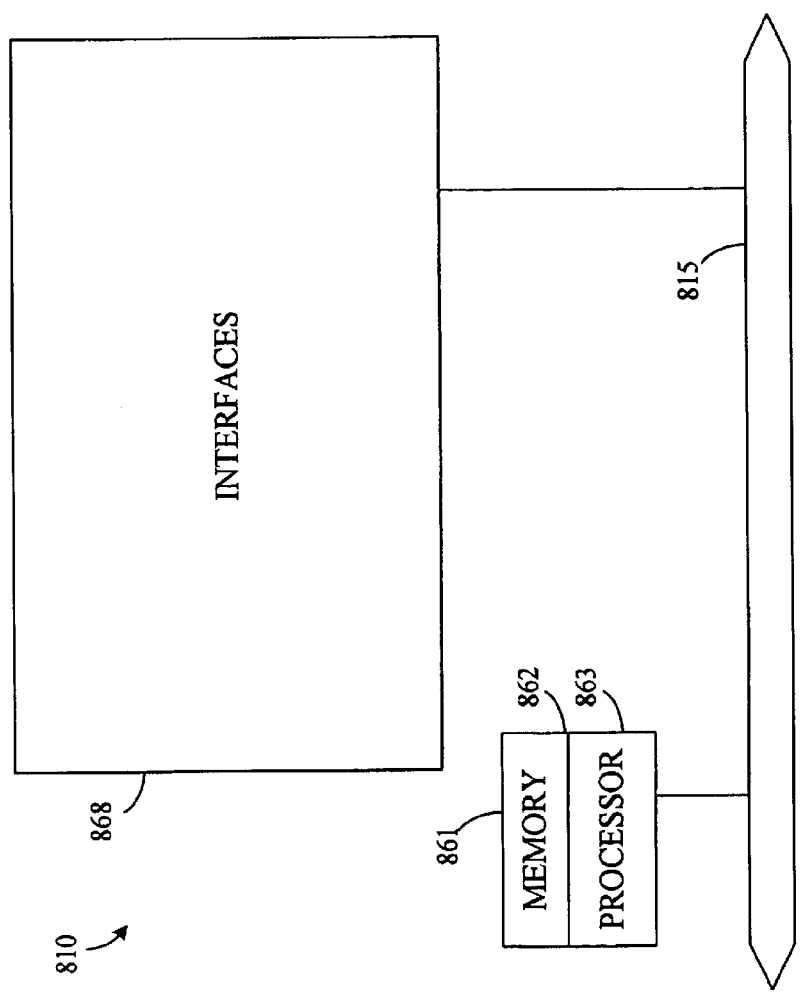

METHOD AND APPARATUS FOR PROVIDING RESERVED RATES TO MULTIPLE FLOWS ON A NETWORK INTERFACE

BACKGROUND OF THE INVENTION

This invention relates to a system for efficiently providing reserved rates to multiple flows at a network interface. Broadly speaking, the invention involves the determination of what packets to deliver immediately and what packets to queue or drop. More specifically, the present invention is concerned with quality of service guarantees or contracts for network bandwidth to various subscribers or customers. This level of service is treated as a contract, which should not be broken at the service provider level. The relevant component in the present invention is an interface such as a router interface, which makes differing levels of service available for various traffic flows.

Having enough bandwidth has increasingly become a problem particularly on wide area networks such as the Internet. Multiple users often must transmit information over the same limited capacity physical lines. Service providers often specify levels of service in terms of "reserved rates" and "peak rates."

These rates guarantee that for the multiple users accessing a specific network device, all of the users will be assured at least their reserved rate. Furthermore, data flows must be allowed to have actual transmission rates between the specified reserved and peak rates. The sum of the reserved rates often is equivalent to an interface's entire bandwidth.

Because some data flows are allowed to burst up to a peak rate, it is possible that in the very short term, not all data flows will be able to transmit data at their reserved rates at a specified moment in time. Dropping or queueing the packets according to a "traffic-shaping algorithm" is often the only alternative, but any system for dropping or queueing must still guarantee that the perceived rate as seen by the user never falls below the reserved rate.

Current methods to solve the problem include schemes such as Weighted Fair Queuing and its variant Self Clocked Fair Queueing. These systems provide a way to handle delay-sensitive traffic in an expeditious way while fairly sharing the remaining bandwidth between other data flows. These systems sort packets in a queue based on the start time offset by the product of the length of packet and a weight that represents the packet data flow's share of the bandwidth. These schemes are well known in the art.

Unfortunately, such schemes require sorting the packets for placement in a queue. These sorting schemes do not scale well as the number of data flows increases for a particular interface. Specifically, these schemes typically have processing overhead that grows linearly, and at best, logarithmically as a fraction of the number of flows.

What is needed is an improved scheme for transmitting, queuing, or dropping packets at a network interface that minimizes overhead while guaranteeing reserved rates and fairly allocating the remaining bandwidth to the various flows on the network interface.

SUMMARY OF THE INVENTION

The present invention provides a flow control system that effectively provides reserved rates for multiple connections at the interface of a network device.

Quality of service is critical to maintaining efficient delivery of data under a variety of requirements and constraints. Voice data must be transmitted at a constant bit rate, video at a psuedo-constant bit rate, and data at an efficient best efforts rate. Multiple transmissions often must proceed simultaneously on a single medium. The present invention provides management of multiple flows at a network device interface such as a router interface to assure maximum usage of the bandwidth available on the physical line while guaranteeing minimum reserved rates for individual flows. This invention is particularly applicable to cable and fiber optic infrastructure, but is pertinent to any lines capable of handling multiple flows simultaneously over that same line.

One aspect of the invention relates to a system for controlling data transmission rates for various flows connected to a network device interface. The system can be characterized as follows: (1) one or more processors; (2) memory coupled to at least one of said one or more processors; (3) a reserved rate meter for each flow, where each meter is configured to track the use of reserved bandwidth associated with the flow; (4) a peak rate meter for each flow, where each meter is configured to track the use of maximum bandwidth associated with the flow; and (5) an interface meter configured to track the use of bandwidth of said network device interface, wherein at least one processor is configured or designed to adjust the meters based on the amount of data transmitted and refresh the meters based on the network device bandwidth.

The present invention has a number of convenient embodiments. A meter can be incremented or decremented based on bandwidth usage. The network device interface can have an interface meter associated with it to track the amount of physical bandwidth available. When the interface meter hits zero, the system can recognize that no network device bandwidth is available for transmission of additional packets. The interface meter can be refreshed at distinct intervals, and the interface meter can be incremented to reflect this update. Although a meter level of zero can conveniently indicate the unavailability of bandwidth, other meter levels can be used as well.

These meters indicate bandwidth availability in relation to the flow's reserved and peak rates as well as in relation to the network device interface. These meters track the usage of bandwidth across the network device interface as well as across the individual flows. The peak and reserved meters are refreshed based on the associated peak and reserved rates and the interface meter is refreshed based on the network device bandwidth. If a particular flow has depleted its reserved bandwidth and either its peak bandwidth or interface bandwidth based on data transmissions, the system can determine how long a particular piece of data should be buffered (a "traffic-shaping delay") until it can be put on the network. In one embodiment of the invention, the system can, via a traffic-shaping algorithm, select a queue based upon the length of time so that the chosen queue has a dequeuing time that matches the traffic-shaping delay.

Meters provide a convenient way of practicing one embodiment of the invention, but many other embodiments exist. Token buckets may conveniently serve as one form of meter. Empty buckets indicate that the interface bandwidth, reserved bandwidth, or the peak bandwidth have been consumed. Buckets containing tokens indicate the amount of bandwidth available for use by a particular flow.

One aspect of the invention relates to a method of controlling data queuing at an interface such as a router interface. The method may be characterized by the following sequence: (1) providing a token bucket representation of the bandwidth available at the network device interface; (2)

providing token buckets for each flow representing the reserved rate and peak rate associated with each particular flow; (3) refreshing the number of tokens in each bucket based on the data transmitted and bandwidth usage of each flow; and (4) subtracting the number of tokens equivalent to the size of a packet from the interface, peak, and reserved token buckets associated with a packet enqueued to output when the associated reserved token bucket is not empty or both the interface and associated peak token buckets are not empty. During this subtraction process, the peak and reserved token bucket values can sometimes turn negative.

These token buckets track the usage of bandwidth across the network device interface and across the various flows connected to the interface. Tokens are added at rates equivalent to the reserved and peak rates for the individual flows and at a rate equivalent to the network device bandwidth for the interface token bucket.

Another aspect of the invention provides an apparatus for controlling data flow through a network. The apparatus may be characterized by the following features: (1) one or more processors; (2) memory coupled to at least one of the one or more processors; (3) a plurality of token buckets associated with the reserved and peak rates for each data flow; (4) a token bucket associated with the bandwidth for the network device interface; (5) the system wherein the processor is configured or designed to send the data from a flow to output if either the reserved token value is not zero or the interface token value and the peak token value are not zero.

The processors are configured or designed to allow data transmission for a particular flow when that flow has enough tokens in the required buckets. The processors are designed to refresh token buckets at certain intervals. These refresh and updates can occur either by interrupt or by event. Interrupt driven refresh would allow more systematic updates to the token buckets, but would require greater overhead at the network device level. Event driven updates would refresh and update token buckets only upon the receipt of data of the triggering of an event. Both are effective for the present invention. The processors are also designed to account for overuse of bandwidth by debiting the token buckets appropriately for a flow that has used more than its allocated bandwidth. This debit can then be used by the processor to adjust the queuing delay for future data packets on the particular data flow. The one or more processors may have additional roles. For example, they may determine the network traffic-shaping delay required for the data. And, based upon the delay, the one or more processors may discard data or enqueue data according to a traffic-shaping algorithm.

As suggested above, the flow control system is designed for use with a large number of bursty flows. Some flows may always be transmitting at rates between their reserved and peak rates. Others may never reach their peak rate while still other flows may consistently seek to transmit at rates above their assigned peak rates. The processor or apparatus generally must guarantee that all flows get at least their reserved rates while maximizing usage of available bandwidth. The data that can not be transmitted at a particular time must be queued or dropped in a fair manner based on the prior bandwidth usage of that particular flow. Data that is queued must be traffic shaped based on a delay that is associated bandwidth over-usage.

Embodiments of the present invention further relate to a computer-readable medium including instructions for applying the above mentioned interfaces and methods. These and other features of the present invention will be described in more detail below in the detailed description of the invention and in conjunction with the following figures.

These and other features and advantages of the present invention will be described below with reference to the associated drawings.

BRIEF DESCRIPTION OF THE DRAWINGS

FIG. 8 is a block diagram of a router that may be used in conjunction with the methods of the present invention.

DETAILED DESCRIPTION OF THE PREFERRED EMBODIMENTS

This invention pertains to maximizing bandwidth usage at a network device interface while preserving minimum levels of service for particular data flows. Multiple data flows are connected at a network device interface such as a router interface. Data ready for transmission across the network device interface is transmitted, queued, or dropped based on the network usage of the data flow and the available bandwidth on the network device interface.

The data flow has certain characteristics that can be conveniently represented by a reserved rate token bucket and a peak rate token bucket. These token buckets track usage of network bandwidth in relation to the reserved and peak rates allocated to the subscriber of the data flow. A third token bucket, an interface token bucket, represents the capacity of the entire network device interface and the physical line associated with the network device.

While most embodiments described herein represent the reserved and peak rates of the individual data flows and the capacity of the network device interface as token buckets, there are alternative representations. For example, the usage of bandwidth in relation to the reserved and peak rates and the network device interface can be more generally represented by other abstractions such as a meter or a counter.

The inventive approach to guaranteeing reserved rates and maximizing bandwidth usage is easy to implement and scales well with additional data flows. In contrast to systems known in the art which require at least logarithmic growth of processing overhead, this system for using token buckets scales with minimal additional overhead. Coupled with an effective traffic-shaping algorithm such as that described in U.S. patent application Ser. No. 09/276,917 (filed Mar. 26, 1999, naming Chandran et al. as inventors, titled "NET- WORK TRAFFIC SHAPING USING TIME-BASED QUEUES," and incorporated herein by reference for all purposes), this system can achieve the desired effect with constant per packet computational overhead.

Token Bucket Based Flow Control

Figure 1:
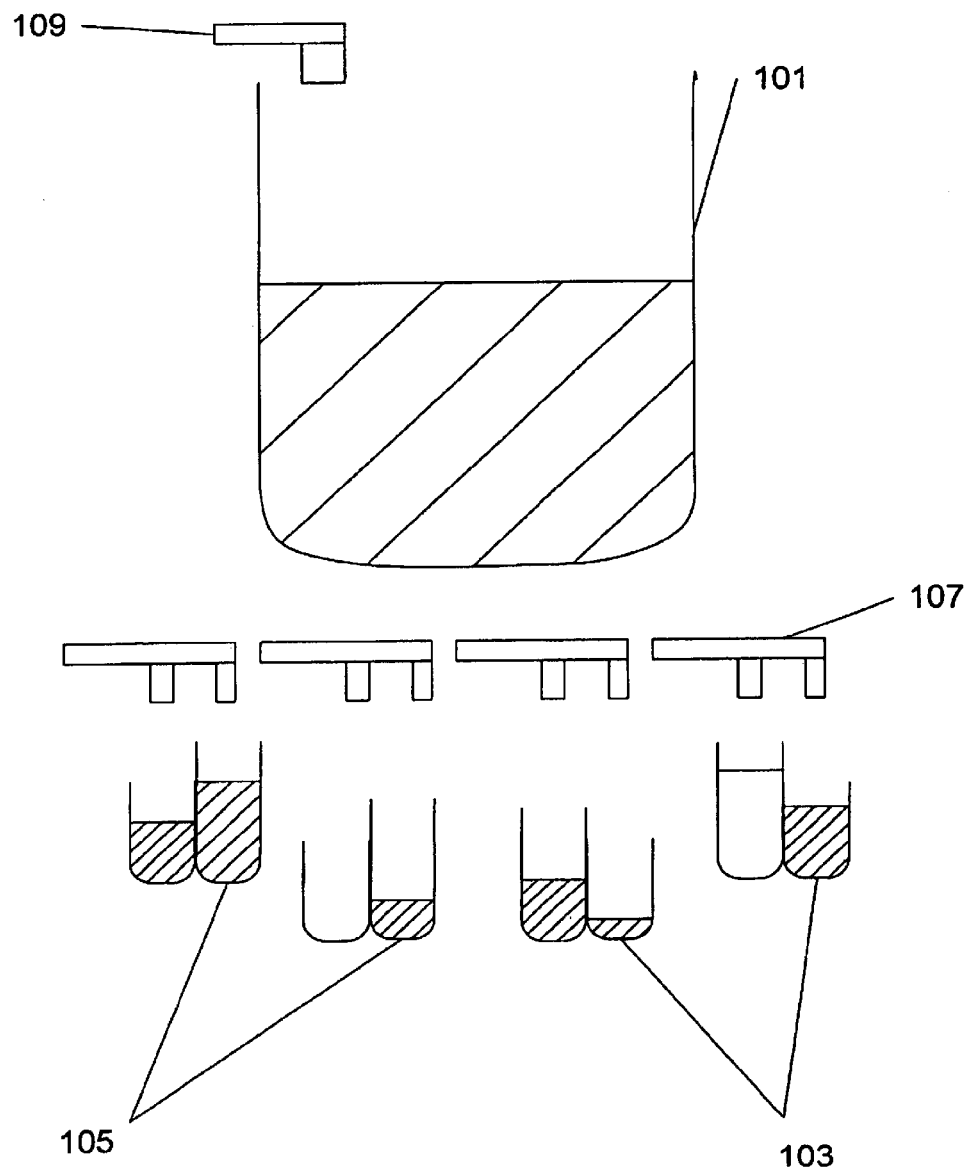
FIG. 1 is a block diagram illustrating the logical elements of a token-based flow control system implemented on a network device or devices, in accordance with an embodiment of this invention.

FIG. 1 depicts one approach to providing reserved rates to multiple flows at a network interface. The figures are presented from the perspective of a network device (or devices) that receives a packet and is responsible for controlling the transmission of that packet. Generally, the network device (or devices) is referred to as the "system."

FIG. 1 conceptually shows the network device interface, such as a router interface and various flows represented as buckets. A token bucket 101 tracks the network device interface by monitoring bandwidth usage across the interface. In one embodiment of the invention, the network interface could have a maximum capacity of N bits per second and each bit could be represented by one token. A spigot 109 would supply network interface token bucket 101 with N tokens per second. These N tokens may be added at one second intervals, or alternatively, spigot 109 may add a fraction of these N tokens at the same fraction of a second that has elapsed during an interval. Along the same lines, each token can represent a multiple or fraction of bits. Each token could represent eight bits for example, to conveniently convey the use of a byte.

At the physical level, the network device can not transmit more than N bits per second, so that flows or connections linked to the network device must together not be allowed to transmit more than N bits per second. Each individual flow is represented by a reserved token bucket 103 and a peak token bucket 105 that track the bandwidth consumption of the flow with respect to the reserved and peak rates. Just as the network interface token bucket 101 represents the network device bandwidth, reserved token bucket 103 and peak token bucket 105 represent the reserved and peak rates of a flow connected to the network device. A flow having no guaranteed rate is not given a peak or reserved token bucket. In some of the embodiments described herein, it is convenient to treat such flows as having a reserved token bucket that is always empty.

The network device interface has capacity in the form of tokens that is equivalent to the sum of capacities of the reserved rate token buckets of the various flows. At any given time, the interface token bucket presents a snapshot of bandwidth used on the interface and gives an approximate estimate of the spare capacity available for use in the near future. A depleted interface token bucket 101 means that the network device has reached its physical bandwidth limit and can not transmit any other packets at that moment in time. This will remain the case until interface token bucket 101 is refreshed by spigot 109. Whenever the interface token bucket 101 is refreshed, the reserved and peak rate token buckets are also refreshed. The reserved rate token buckets 105 are refreshed with an amount of tokens equal to the amount used to refresh the interface token bucket 101. The peak rate token buckets 107 are refreshed with the number of tokens equivalent to the peak rate for that particular flow.

For example, suppose in one embodiment of the invention the interface token bucket is refreshed at a rate of 800 tokens every second, with each token representing 1 bit, to give the network device a bandwidth of 800 bits per second. Suppose also that the four flows shown in FIG. 1 each have a reserved rate of 200 bits per second and peak rates of 300 bits per second. At each one second interval, the interface token bucket would be refreshed with 800 tokens. Each reserved token bucket 103 would then be refreshed with 200 tokens and each peak token bucket 105 would be refreshed with 300 tokens. Sometimes the various data flows will have different reserved rates. For example, one may be allotted 300 bits per second of reserved rate and another 100 bits per second of reserved rate.

When a flow depletes its reserved token bucket 103, it signifies that the flow has reached its reserved rate of transmission. At that point, in accordance with an embodiment of this invention, the flow should only be allowed to transmit if there are unallocated tokens in the interface token bucket 101. When a flow depletes its peak rate token bucket 105, it has reached its peak rate of transmission and should not be allowed to transmit. The peak rate token bucket 105 necessarily has at least as much capacity as the reserved rate token bucket, as a flow must have a peak rate of transmission higher than its guaranteed reserved rate of transmission.

In one embodiment of the invention, each time a flow sends a packet of size R bits through the interface, R tokens are deducted from that particular flow's peak token bucket 105 and reserved token bucket 103. The number of tokens in these buckets is monitored so that the system can determine when a traffic-shaping algorithm should be triggered. Typically, a token bucket is constructed to allow accumulation of no more than a maximum amount of tokens. Any tokens received over this maximum are not counted as available.

Token buckets provide a convenient way of representing embodiments of the invention. Empty buckets indicate that the available interface bandwidth, reserved bandwidth, or the peak bandwidth has been consumed. Buckets containing tokens indicate the amount of bandwidth available for use by a particular flow. Although token buckets provide a convenient way of describing one aspect of the invention, they are not the only way.

A general view of the invention makes use of "meters" (of which token buckets are but one example ). A meter can be incremented or decremented based on bandwidth usage. The network device interface can have an interface meter associated with it to track the amount of physical bandwidth available. When the interface meter hits zero, the system can recognize that no network device bandwidth is available for transmission of additional packets. The interface meter can be refreshed continuously or at distinct intervals, and the interface meter can be incremented to reflect this update.

The same is true for the reserved rate meters and the peak rate meters for each flow. The reserved and peak rate meters can be refreshed continuously or at various intervals, and these meters can be incremented to reflect the updates. Usage of bandwidth across a particular flow would decrement these reserved rate and peak rate meters. The system would monitor these meters to determine when to transmit and when to traffic shape packets from particular flows. The system would also update these meters to reflect transmission of packets from a particular flow.

The meter level indicating the depletion of available bandwidth can also be arbitrarily set. Although it is convenient to indicate no additional availability of bandwidth by noting an empty bucket or a metering level of zero, other levels can be arbitrarily set to indicate the same. This arbitrary level can then be changed based on usage and refreshed periodically.

These approaches are but a few amongst many that are within the scope of this invention. For simplicity, all approaches to determining how much allotted bandwidth has been consumed will be generally referred to as either meters or token buckets. Such token buckets can be implemented as hardware or as firmware or software executed on one or more processors linked to memory. The general structures and methods used for such embodiments will be apparent to those of skill in the art.

Token Bucket Flow Control Systems

Figure 2:
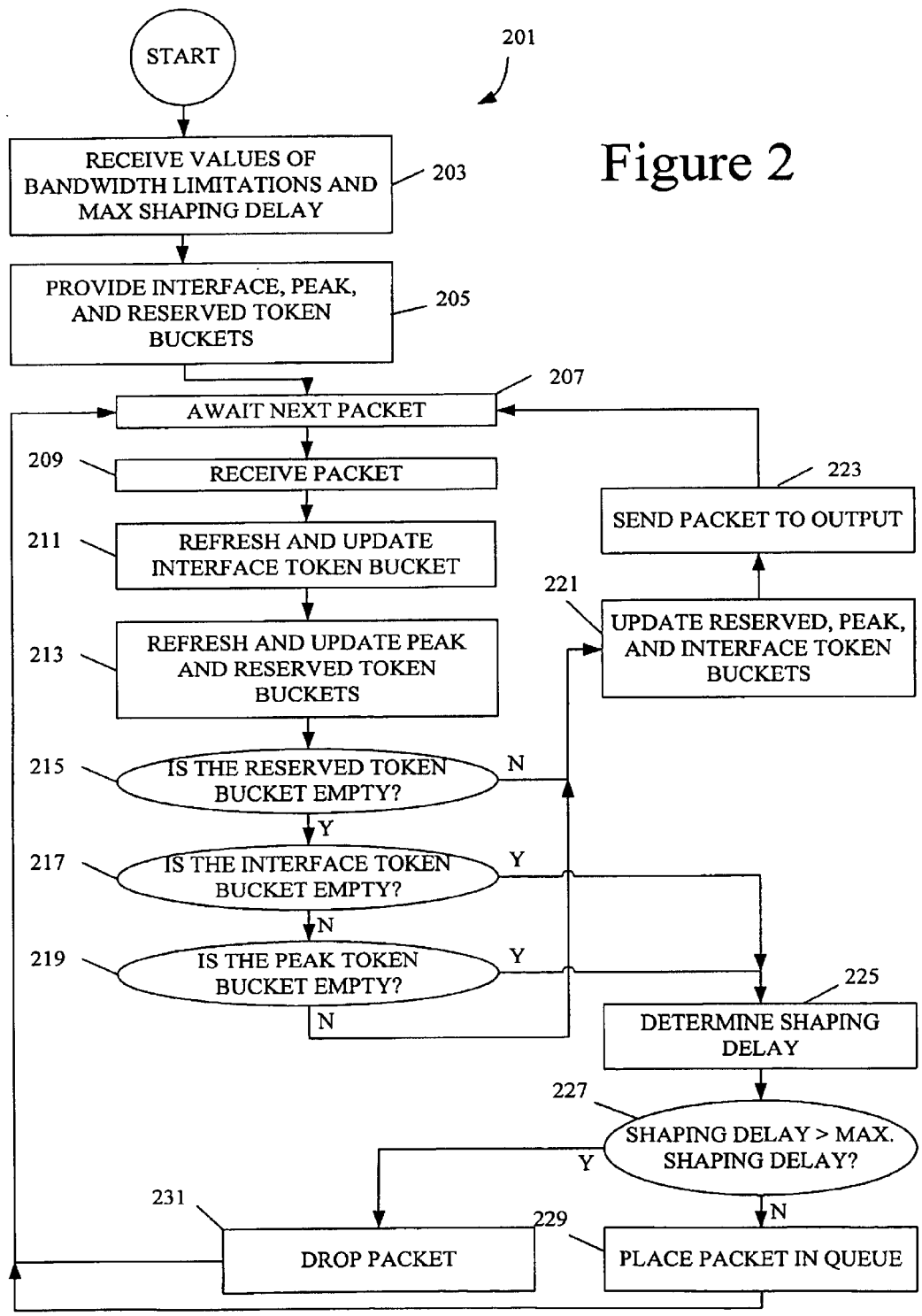
FIG. 2 is a process flow diagram depicting the flow control system.

FIG. 2 presents a process flow diagram for one method of flow control in accordance with a token bucket embodiment of this invention. A network device, such as a router, is configured at 203 with the bandwidth limitations of the physical line and the router hardware. It is also configured with a maximum shaping delay that will affect when packets should be dropped. If a packet cannot be delivered immediately based upon a traffic flow's reserved or peak rate, then a shaping algorithm will come into play and buffer or drop the packet. If the traffic-shaping algorithm would have to buffer a packet for a length of time greater than the maximum traffic-shaping delay, then the packet will be dropped.

The network device interface will be connected to a physical data transport medium such as a copper wire line, an optical fiber, a wireless transceiver, or the like. The network device may have access to the entire line and may therefore be allocated the physical bandwidth limit of the transmission medium. However, the network device may also be allotted only a fixed amount of upstream bandwidth. The network device can also have the capability of being reconfigured based on varying upstream bandwidth availability.

Returning again to FIG. 2, the device is configured with interface, reserved, and peak rates (token buckets) at 205. Then the network device, at 207, awaits the next packet to be transmitted. In one embodiment of the invention, these packets, which are received at 209, can either arrive from the individual flows connected to the network device interface or from the network device buffer. As the network device can be connected to a variety of output mediums, the network device likewise can handle packets arriving from individual flows on different mediums.

After the network device interface has received the packet at 209, the system updates the interface token bucket at 211. In one embodiment of the invention, the update is performed by considering the bandwidth of the network device interface and the time elapsed since the last update. For example, in cases where the network device interface has a capacity of 800 bits/second, one token represents a bit, and one half of a second has elapsed since the last update, the interface token bucket is refreshed with 400 additional tokens by adding 400 tokens to the number of tokens already in the interface token bucket. However, the network device interface still has bandwidth limitations at any given moment in time, so the interface token bucket is limited to containing a maximum of 800 tokens. In a case where the interface token bucket had no remaining tokens, 400 tokens would be added to the token bucket. However, in a situation where the interface token bucket already had 700 tokens, the updated interface token bucket would still have only 800 tokens. When a new packet has been received, the interface token bucket or ITB can be updated as:

$$ITB \rightarrow tokens\mathrel{+}=time\_elapsed * ITB \rightarrow token\_refresh\_rate$$

and the network device bandwidth can be accounted for by taking $$ITB \rightarrow tokens = MAX\ (interfaceBandwidth, ITB \rightarrow tokens).$$

After the interface token bucket has been refreshed, the system updates the peak and reserved token buckets at 213. In one embodiment of the invention, the reserved token bucket update is performed by considering the reserved rate of the associated flow and the time elapsed since the last update. For example, in a case where the reserved rate is 300 bits/second, one token represents a bit, and one half of a second has elapsed since the last update, the reserved token bucket is refreshed with 150 additional tokens by adding 150 tokens to the number of tokens already in the interface token bucket. However, the reserved rate limits the flow rate at any given moment in time, so the reserved token bucket is limited to containing a maximum of 300 tokens. In a case where the reserved token bucket has no remaining tokens, 150 tokens would be added to the token bucket. However, in a situation where the reserved token bucket already had 200 tokens, the updated reserved token bucket would still have only 300 tokens. When a new packet has been received, the reserved token bucket or RTB can be updated as follows:

$$RTB \rightarrow tokens\mathrel{+}=time\_elapsed * RTB \rightarrow reserved\_rate$$

and the reserved rate limitation can be accounted for by taking $$RTB \rightarrow tokens = MAX\ (RTB \rightarrow reserved\_rate, RTB \rightarrow tokens).$$

In one embodiment of the invention, the peak token bucket update is performed by considering the reserved rate of the associated flow and the time elapsed since the last update. For example, in a case where the peak rate is 400 bits/second, one token represents a bit, and one half of a second has elapsed since the last update, the reserved token bucket is refreshed with 200 additional tokens by adding 200 tokens to the number of tokens already in the interface token bucket. However, the peak rate limits the flow rate at any given moment in time, so the peak token bucket is limited to containing a maximum of 400 tokens. In a case where the peak token bucket has no remaining tokens, 200 tokens would be added to the token bucket. However, in a situation where the peak token bucket already had 400 tokens, the updated peak token bucket would still have only 400 tokens. When a new packet has been received, the reserved token bucket or RTB can be updated as:

$$PTB \rightarrow tokens\mathrel{+}=time\_elapsed * PTB \rightarrow peak\_rate$$

and the reserved rate limitation can be accounted for by taking $$PTB \rightarrow tokens = MAX\ (PTB \rightarrow peak\_rate, RTB \rightarrow tokens).$$

Note that if the packet received at 209 is not associated with a flow having a guaranteed flow rate, then it has no reserved or peak token buckets to refresh. In other words, the process skips 213. Further some flows may have a reserved flow rate but without the benefit of a peak flow rate. In such cases, a flow will have a reserved flow token bucket but no peak rate token bucket. Thus, when the process treats a packet for such flow, it will refresh and update a reserved token bucket but not a peak token bucket at 213.

The peak and reserved token bucket updates must be performed for all of the buckets associated the guaranteed flows connected to the network device interface. In embodiments of the invention, one reasonably skilled in the art would recognize that the number of tokens in the peak or reserved token buckets could be calculated dynamically. In one embodiment of the invention, the difference between the peak token bucket value and the reserved token bucket value would remain constant, allowing the system to calculate one based on the value of the other. One skilled in the art would also recognize that the reserved, peak, and interface token bucket values can be updated and refreshed at different times to achieve similar results.

Figure 3:
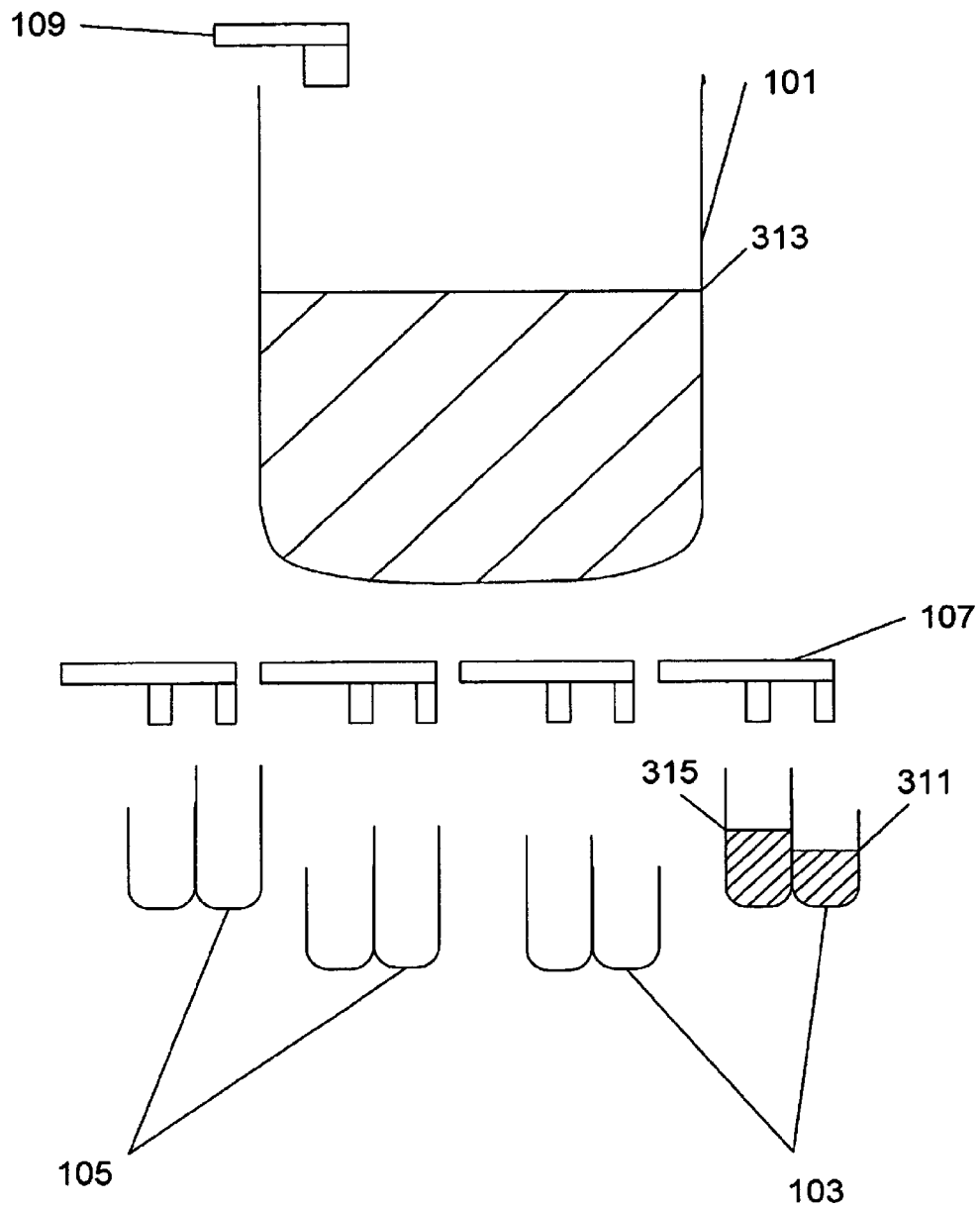
FIG. 3 is a block diagram illustrating the flow control system where the reserved token bucket is not empty.

The network device at 215 determines whether the packet should be sent to output. The network device does this by taking the reserved token bucket value of the flow from which the packet arrived and checks if the reserved token bucket minus the packet size is greater than or equal to zero. FIG. 3 shows this situation. One of the reserved token buckets 103 contains a number of tokens indicated by level 311. If this value is greater than or equal to zero, the peak, reserved, and interface token buckets are updated at 221 and the packet is sent to output at 223. Note that a corresponding peak rate token bucket has a level 315. Levels 311 and 315 are provided for the same flow.

As one example, suppose the interface token bucket contains 800 tokens, each token represents one bit, the reserved token bucket contains 400 tokens, the peak token bucket contains 500 tokens, and the packet is 200 bits. The network device interface would check whether the reserved token bucket with 400 tokens representing 400 bits minus the packet size of 200 bits is greater than or equal to zero. Noting the affirmative, the network device would update the interface, reserved, and peak token buckets and send the packet to output. The reserved, peak, and interface token buckets associated with the flow would each be decremented by 200 tokens representing the 200 bit size of the transmitted packet at 221. Note that a flow without a guaranteed rate will be treated as if its reserved token bucket is empty at 215.

Assuming that the reserved token bucket is, in fact, empty or the flow does not have a reserved rate, then the device next considers whether the interface token bucket is empty (217 of FIG. 2) and whether the peak token bucket is empty (219 of FIG. 2). If either of these criteria are met, then the packet is not immediately transmitted. Rather, it is subject to a traffic shaping delay at 225.

In order to guarantee fair distribution of bandwidth amongst the various flows, the traffic-shaping delay accounts for the value of the reserved rate and the packet size at 225. In one embodiment of the invention, the traffic-shaping delay is determined as follows:

delay=(packetsize-$RTB{\rightarrow}$tokens)/reserved_rate.

In the case of a flow that has no reserved rate, the traffic-shaping delay may be determined as follows:

delay=(packetsize-$ITB{\rightarrow}$tokens)/$ITB{\rightarrow}$token_refresh_rate.

For a flow having a reserved rate, where the packet size is 100 bits, the number of tokens remaining in the reserved token bucket is 0, and the reserved rate for the flow associated with the packet is 300 bits/second, the delay would equal ⅓ of a second or 333 milliseconds. The network device interface then checks whether this delay is larger than a maximum permitted shaping delay at 227. If this delay is larger than a set maximum, the packet is dropped at 231 and the network device interface awaits the next packet at 205. Otherwise, the packet is placed in a queue at 229. A deadline for dequeueing this packet can be calculated by adding the delay to the current time.

A maximum shaping delay is often determined by considering the length of a transmission queue for a traffic-shaping algorithm, available memory, and a maximum per packet delay. A larger maximum shaping delay value corresponds with an increase in the number of packets that would need to be buffered by the traffic shaper. A large shaping delay can potentially mean a larger per packet delay, as more time would be spent by the packet in the shaper. A very large delay would make shaping useless, as the source of packets might timeout and assume the packets have been dropped, leading to retransmissions, which is exactly what the shaper seeks to avoid in the first place. In one embodiment, the maximum shaping delay, is between about 100 and 500 milliseconds. Of course, the invention is not limited to this range.

A packet queued at 229 can be placed in a buffer with an interrupt set to dequeue the packet at the end of the delay. One or more buffers can be used to queue the delayed data. Instead of setting interrupts, the system can be configured to periodically check the buffers for packets ready to be dequeued. In another embodiment, the system can check the buffer for packets that should be dequeued whenever the system receives a packet from the network. This would not require either interrupts or periodically checking the buffer, but could potentially leave packets in the buffer for an unnecessarily long period of time. One possible solution to this problem is to combine the efficient event driven method with periodic but infrequent interrupts. This minimizes the use of resource intensive interrupts while guaranteeing that the packets do not remain in the buffer for more than a specified period of time.

In a preferred embodiment, a series of time-based queues can be used to aid in the traffic-shaping mechanism. Examples of time-based queuing systems are described in U.S. patent application Ser. No. 09/276,917 previously incorporated by reference. Time-based queues can define separate increments of time within the time period, and each time-based queue can be set to dequeue its contents at a separate time. For example, a group of three time-based queues may each have 40 millisecond increments of time. Together they may define a period of time of 120 milliseconds. Initially, a first of these queues may be set to dequeue in 40 milliseconds, a second to dequeue in 80 milliseconds, and a third to dequeue in 120 milliseconds. At 40 milliseconds, the first queue dequeues its contents and it may be set with a new dequeue time of 120 milliseconds. At that time, the second queue's time to dequeue is 40 milliseconds and the third queue's time to dequeue is 80 milliseconds in the future. In time-based queues, queue identifications may be recycled, so that after a chosen queue dequeues its contents (at the specified time), it is rescheduled for a new dequeing time. It is then available to buffer new data that must be delayed by a time matching the new dequeuing time. Preferably, a given time-based queue can simultaneously buffer data associated with different nodes. Preferably, it can also buffer network data packets of varying sizes.

Figure 4:
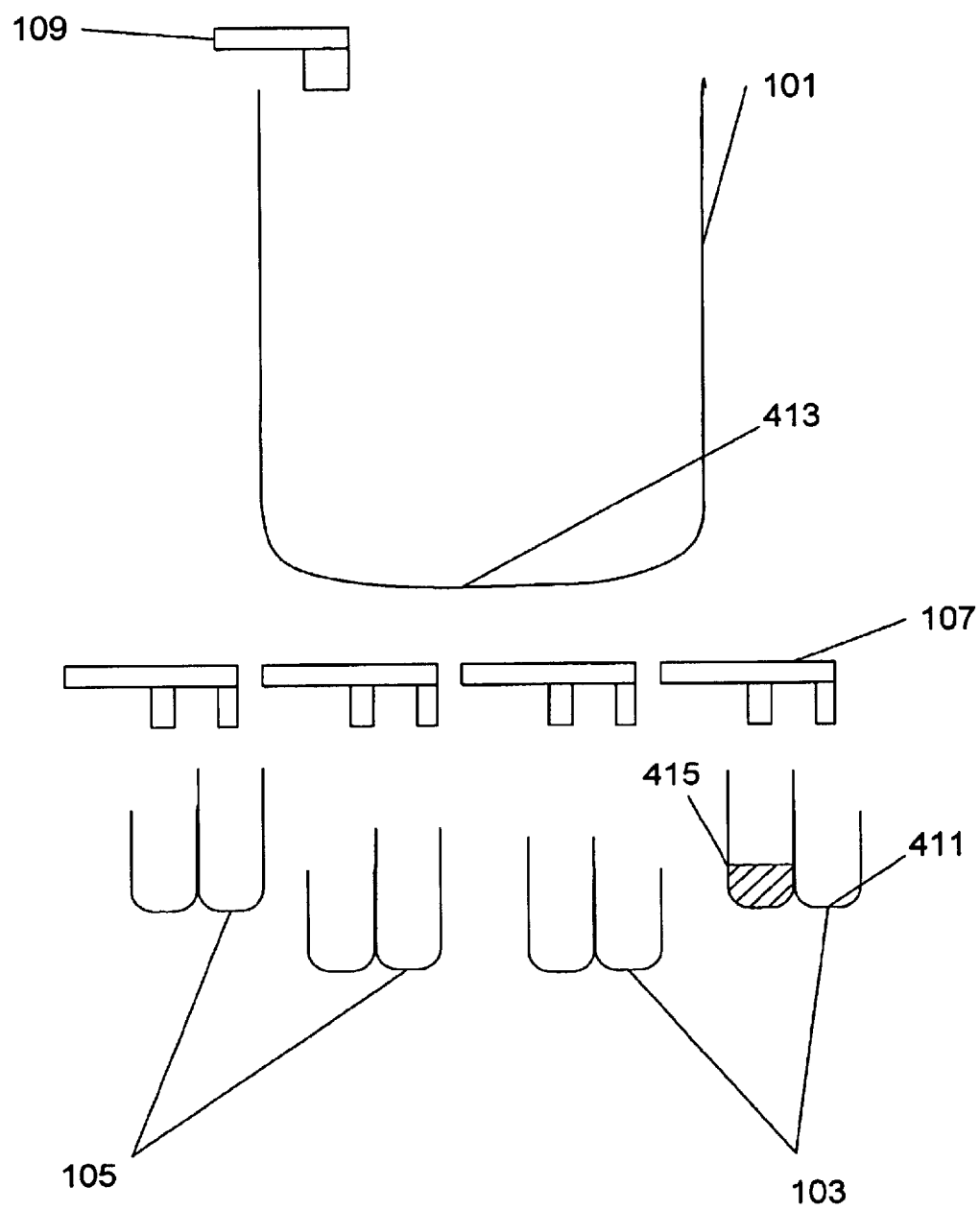
FIG. 4 is a block diagram illustrating the flow control system where the reserved and interface token buckets are empty.

FIG. 4 shows the case where the reserved token bucket minus the packet size empty, at 411. In other words, decision 215 is answered in the affirmative. The network device interface then checks to see if the interface token bucket level 413 has enough tokens to transmit the received packet at 217. In other words, the network device checks if the interface token bucket minus the packet size is greater than or equal to zero at 217. If this value is less than zero, the network device must delay transmission of the packet. In this example, there are no tokens in interface token bucket 101 (see level 413), so the packet is sent to traffic shaping per the flow set forth in FIG. 2.

Figure 5:
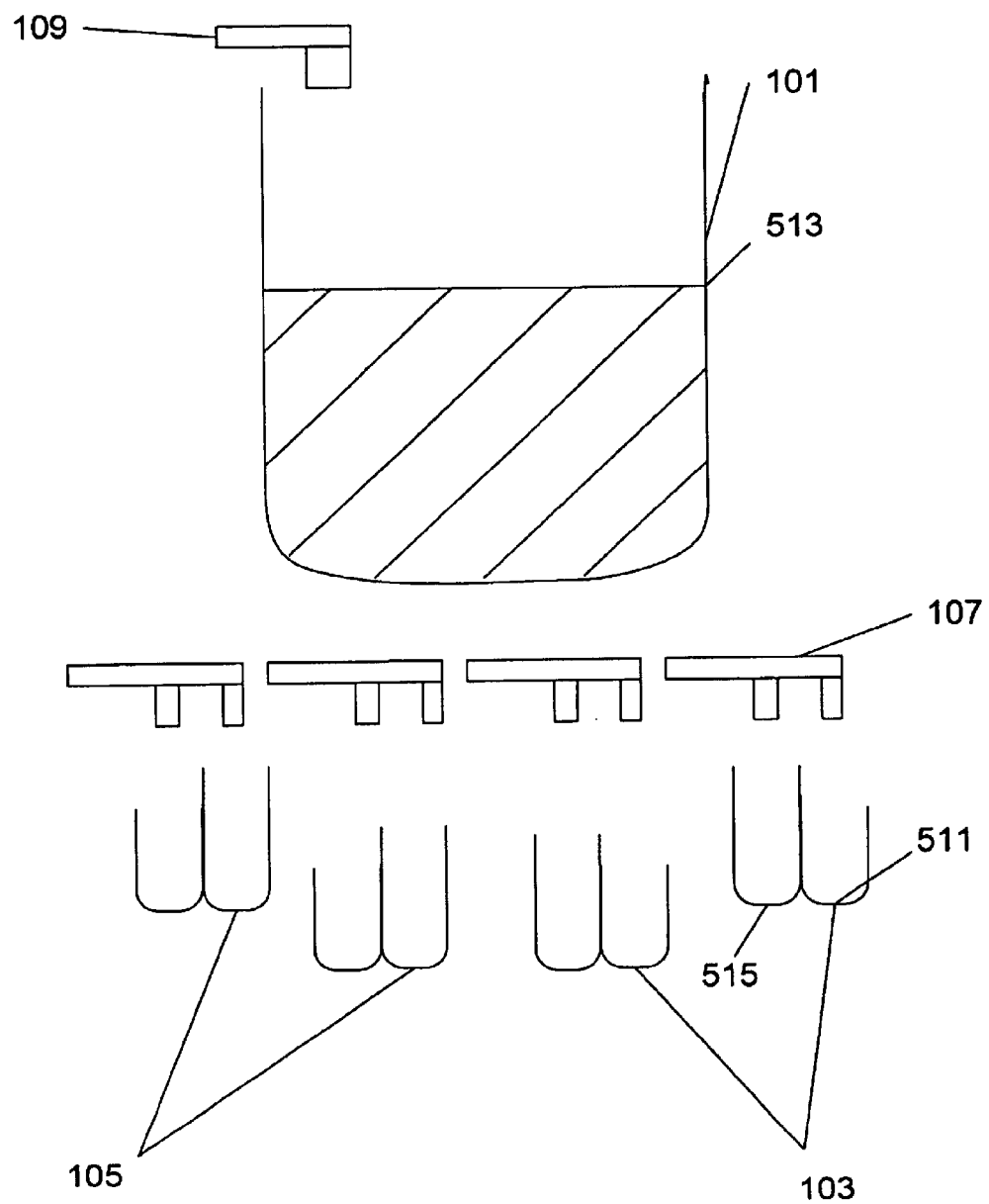
FIG. 5 is a block diagram depicting the flow control system where the reserved and peak token buckets are empty, but the interface token bucket is not empty.

FIG. 5 shows another situation where a traffic-shaping algorithm is used. In this case, the reserved rate token bucket is empty (or will be empty if the next packet is sent) as indicated by level 511. In this situation, if the interface token bucket level 513 has been determined to be sufficient at 217, the peak token bucket level 515 is checked at 219. If the peak token bucket minus the packet size is less than or equal to zero, as shown in FIG. 5, then the packet is sent to traffic shaping per the flow outlined in FIG. 2. As mentioned, some flows may have a reserved rate but not a peak rate. For such flows, when the interface encounters 219, it always answers in the affirmative.

In the example of FIG. 5, a shaping delay must be determined at 225. Insufficient tokens in the peak token bucket signifies that flow associated with the packet has reached its peak rate and should no longer be allowed to transmit at the present moment. The shaping delay is determined in a manner similar to the case shown in FIG. 3, but this calculation takes into account the value of the peak token bucket. The delay is calculated as follows:

$$delay=(packetsize-PTB{\rightarrow}tokens)/reserved\_rate.$$

Note that when the interface token bucket is empty, the system uses the reserved token bucket to calculate delay. When peak token bucket is empty, the system uses the peak token bucket to calculate delay.

In the case where the flow has a reserved rate but no guaranteed peak rate (beyond the reserved rate), and process control goes through 219, the shaping delay may be calculated as follows:

$$delay=(packetsize-ITB{\rightarrow}tokens)/ITB{\rightarrow}token\_refresh\_rate.$$

Figure 6:
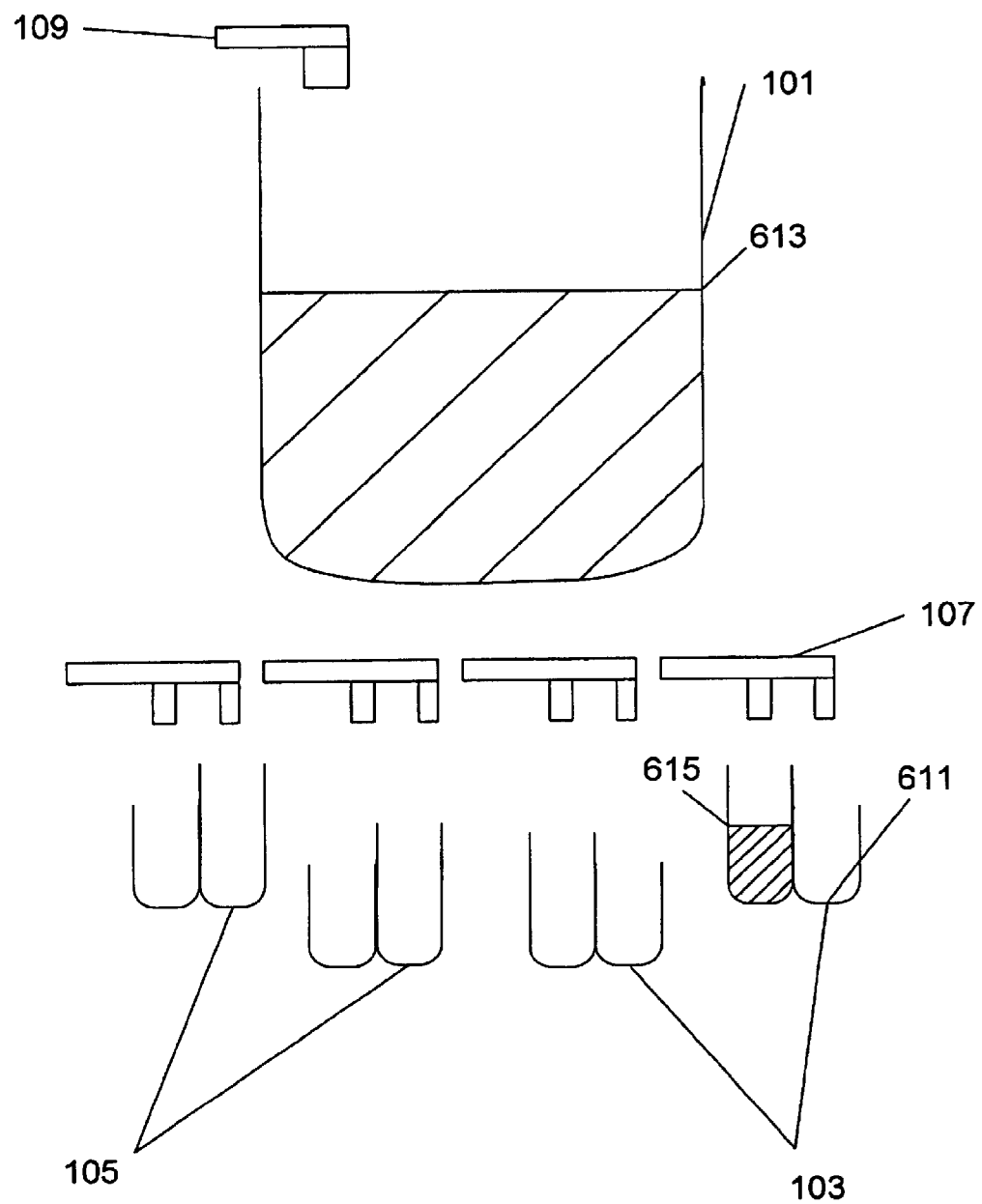
FIG. 6 is a block diagram showing the flow control system where the reserved bucket is empty, but the interface and peak token buckets are not empty.

FIG. 6 shows the case where the reserved token bucket does not contain enough tokens, but both the interface token bucket level 613 and the peak token bucket level 615 contain enough tokens to allow transmission of the packet. The reserved, peak, and interface token buckets are updated at 221. For example, where the reserved token bucket contained 0 tokens, the peak token bucket contained 200 tokens, the interface token bucket contained 400 tokens, each token represents one bit, and the packet to be transmitted is 200 bits in length, the situation shown in FIG. 5 would occur. At 215, the network device interface would determine that the reserved token value of 0 minus the packet size of 200 is less than or equal to zero. Consequently, the system would proceed to 217 to determine that the interface token value of 400 minus the packet size of 200 is not less than zero. At 219, the system would find that the peak token value of 200 minus the packet size 200 is not less than zero, so at 221, the updates would result in a reserved token value of -200, an interface token value of 200, and a peak token value of 0.

This flow has thus exceeded its reserved rate. Subsequent packets on this flow can still be transmitted in a similar manner, as long as the interface token bucket remains non-empty. In other words, the flow gets a "credit" of tokens and its token bucket becomes more and more negative. If it happens that the interface token bucket becomes empty, then the packet will be subject to traffic shaping. The delay is calculated as indicated in FIG. 3 above as:

$$delay=(packetsize-RTB{\rightarrow}tokens)/reserved\_rate.$$

Hence the greater the token credit, the higher the penalty paid by that flow in terms of delay. This is how the actual transmission rate of flow is quickly controlled in a fair maimer based on its recent usage history.

Network Devices for Efficient Flow Control

Generally, the technique of the present invention may be implemented on software and/or hardware. For example, it can be implemented in an operating system kernel, in a separate user process, in a library package bound into network applications, on a specially constructed machine, or on a network interface card. In a specific embodiment of this invention, the methods of the present invention are implemented in software such as an operating system or in an application running on an operating system.

A software or software/hardware hybrid system of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example.

Figure 7:
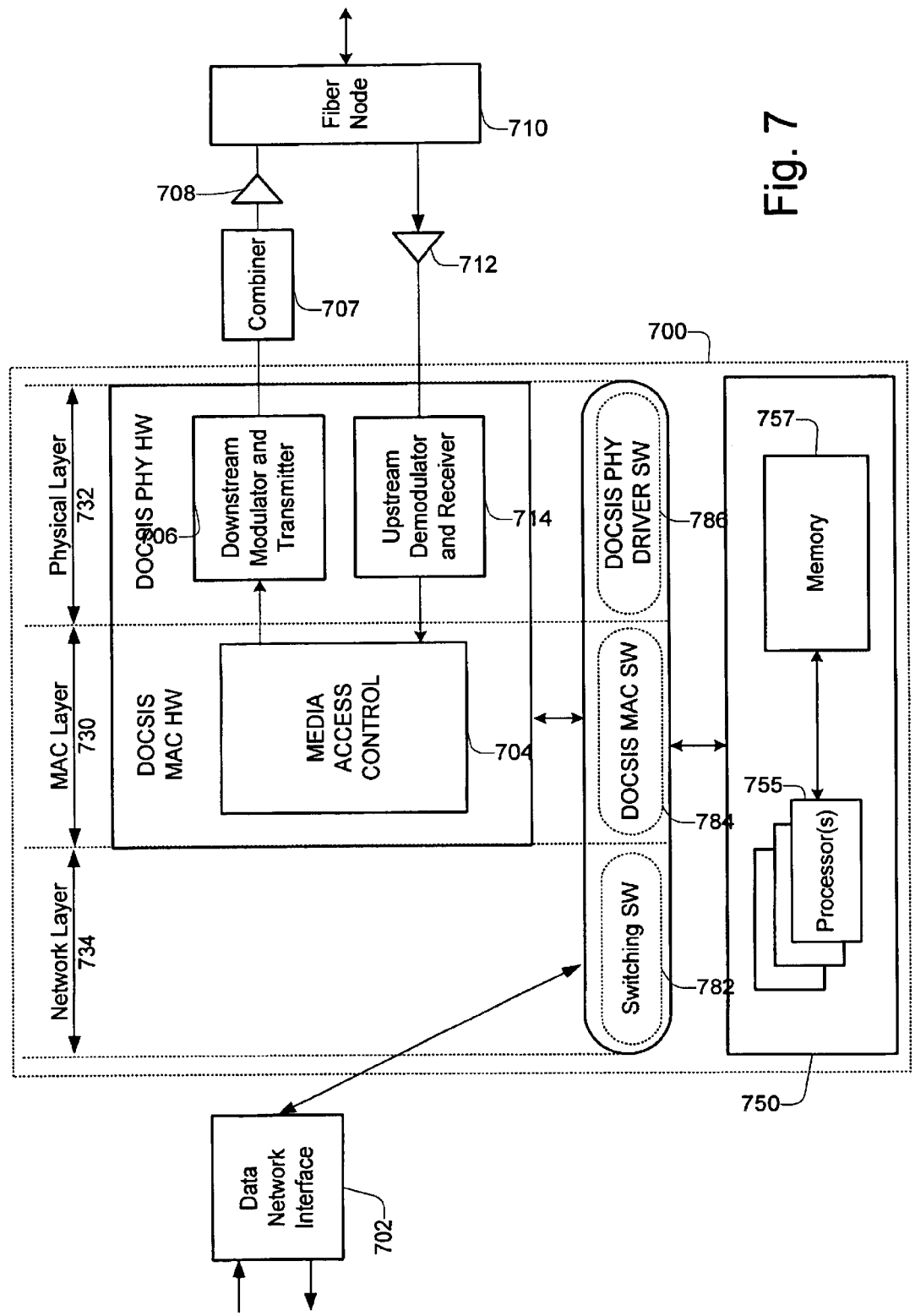
FIG. 7 is a block diagram of a cable modem termination system that may be employed to implement the present invention.

One important class of device that may be used to implement the present invention is the cable modem termination system. FIG. 7 depicts the basic components of a CMTS. A Data Network Interface 702 is an interface component between an external data source and the cable system. External data sources transmit data to data network interface 702 via optical fiber, microwave link, satellite link, or through various other media. Also as mentioned above, a Media Access Control Block (MAC Block) 704 receives data packets from a Data Network Interface 702 and encapsulates them with a MAC header In a specific embodiment as shown in FIG. 7, CMTS 504 provides functions on three network layers including a physical layer 732, a Media Access Control (MAC) layer 730, and a network layer 734. Generally, the physical layer is responsible for receiving and transmitting RF signals on the cable plant. Hardware portions of the physical layer include a downstream modulator and transmitter 706 and an upstream demodulator and receiver 714. The physical layer also includes software 786 for driving the hardware components of the physical layer.

Once an information packet is demodulated by the demodulator/receiver 714, it is then passed to MAC layer 730. A primary purpose of MAC layer 730 is to encapsulate and decapsulate packets within a MAC header, preferably according to the above-mentioned DOCSIS standard for transmission of data or other information.

MAC layer 730 includes a MAC hardware portion 704 and a MAC software portion 784, which function together to encapsulate information packets with the appropriate MAC address of the cable modem(s) on the system. After the upstream information has been processed by MAC layer 730, it is then passed to network layer 734. Network layer 734 includes switching software 782 for causing the upstream information packet to be switched to an appropriate data network interface on data network interface 702.

When a packet is received at the data network interface 702 from an external source, the switching software within network layer 734 passes the packet to MAC layer 730. MAC block 704 transmits information via a one-way communication medium to downstream modulator and transmitter 706. Downstream modulator and transmitter 706 takes the data (or other information) in a packet structure and converts it to modulated downstream frames, such as MPEG or ATM frames, on the downstream carrier using, for example, QAM 64 modulation (other methods of modulation can be used such as CDMA (Code Division Multiple Access) OFDM (Orthognal Frequency Divison Multiplexing), FSK (FREQ Shift Keying)). The return data is likewise modulated using, for example, QAM 16 or QSPK. Data from other services (e.g. television) is added at a combiner 707. Converter 708 converts the modulated RF electrical signals to optical signals that can be received and transmitted by a Fiber Node 710 to the cable modem hub.

It is to be noted that alternate embodiments of the CMTS (not shown) may not include network layer 734. In such embodiments, a CMTS device may include only a physical layer and a MAC layer, which are responsible for modifying a packet according to the appropriate standard for transmission of information over a cable modem network. The network layer 734 of these alternate embodiments of CMTS devices may be included, for example, as part of a conventional router for a packetswitched network.

In a specific embodiment, the network layer of the CMTS is configured as a cable line card coupled to a standard router that includes the physical layer 732 and MAC layer 730. Using this type of configuration, the CMTS is able to send and/or receive IP packets to and from the data network interface 702 using switching software block 782. The data network interface 702 is an interface component between external data sources and the cable system. The external data sources transmit data to the data network interface 702 via, for example, optical fiber, microwave link, satellite link, or through various media. The data network interface includes hardware and software for interfacing to various networks such as, for example, Ethernet, ATM, frame relay, etc.

As shown in FIG. 7, CMTS 504 includes a hardware block 750 including one or more processors 755 and memory 757. These hardware components interact with software and other hardware portions of the various layers within the CMTS. Memory 757 may include, for example, I/O memory (e.g. buffers), program memory, shared memory, etc. Hardware block 750 may physically reside with the other CMTS components.

In one embodiment, the software entities 782, 784, and 786 are implemented as part of a network operating system running on hardware 750. Further, the token bucket and traffic-shaper functions of this invention are preferably implemented in software as part of the operating system.

The methods of this present invention may be implemented on various systems. For example, the invention may be implemented on routers and/or switches. In a specific embodiment, the systems of this invention may be specially configured routers such as, for example, specially configured router models 1600, 2500, 2600, 3600, 4500, 4700, 7200, and 7500 available from Cisco Systems, Inc. of San Jose, Calif. A general architecture for some of these machines will be given below. In an alternative embodiment, the methods of this invention may be implemented on a general-purpose network host machine such as a personal computer or workstation. Further, the invention may be at least partially implemented on a card (e.g., an interface card) for a network device or a general-purpose computing device.

Referring now to FIG. 8, a general purpose router 810 suitable for implementing the present invention includes a master central processing unit (CPU) 862, interfaces 868, and a bus 815 (e.g., a PCI bus). When acting under the control of appropriate software or firmware, the CPU 862 is responsible for such router tasks as routing table computations and network management. It may also be responsible for traffic-shaping, etc. It preferably accomplishes all these functions under the control of software including an operating system (e.g., the Internetwork Operating System (IOS®) of Cisco Systems, Inc.) and any appropriate applications software. CPU 862 may include one or more processors 863 such as a processor from the Motorola family of microprocessors or the MIPS family of microprocessors. In an alternative embodiment, processor 863 is specially designed hardware for controlling the operations of router 810. In a preferred embodiment, a memory 861 (such as non-volatile RAM and/or ROM) also forms part of CPU 862. However, there are many different ways in which memory could be coupled to the system.

The interfaces 868 are typically provided as interface cards (sometimes referred to as "line cards"). Generally, they control the sending and receiving of data packets over the network and sometimes support other peripherals used with the router 810. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 862 to efficiently perform routing computations, network diagnostics, security functions, etc.

Although the system shown in FIG. 8 is one specific router of the present invention, it is by no means the only router architecture on which the present invention can be implemented. For example, an architecture having a single processor that handles communications as well as routing computations, etc. would also be acceptable. Further, other types of interfaces and media could also be used with the router.

Regardless of network device's configuration (for cable plants or otherwise), it may employ one or more memories or memory modules (e.g., memory 861) configured to store program instructions for the network operations and other functions of the present invention described herein. The program instructions may specify an operating system and one or more applications, for example. Such memory or memories may also be configured to store data structures or other specific non-program information described herein.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims.

What is claimed is:

1. A method for controlling data traffic flow through a network device interface supporting multiple data flows, the method comprising:

determining how much bandwidth is being used at the interface;

for a first data flow through the interface, determining how much bandwidth allotted to the first data flow is being used in comparison to a peak rate and a reserved rate associated with the first data flow; and depending on how much bandwidth is being used at the interface and on how much bandwidth of the first data flow is being used in comparison to its peak and reserved rates, determining whether to transmit data for the first data flow.

2. The method of claim 1, wherein determining how much bandwidth of the interface is being used comprises determining the bandwidth consumed by each of the multiple data flows.

3. The method of claim 1, wherein determining how much bandwidth of the interface is being used comprises monitoring tokens representing available bits of data, which tokens are replenished with passing time and consumed by data flowing through the interface.

4. The method of claim 1, wherein determining how much bandwidth allotted to the first flow is being used in comparison to the peak rate comprises monitoring tokens representing available bits of data, which tokens are replenished at the peak rate with passing time and consumed by data used for the first flow.

5. The method of claim 1, wherein determining how much bandwidth allotted to the first flow is being used in comparison to the reserved rate comprises monitoring tokens representing available bits of data, which tokens are replenished at the reserved rate with passing time and consumed by data used for the first flow.

6. The method of claim 1, wherein the first data flow is allowed to transmit a packet provided said first data flow has not exceeded its reserved rate.

7. The method of claim 1, wherein a packet for the first data flow is dropped or delayed in a buffer if said first data flow has exceeded its reserved rate and either the first data flow has exceeded its peak rate or the interface has no available bandwidth.

8. The method of claim 1, wherein if it is determined that data for the first flow should not be transmitted, providing the data for the first flow to traffic-shaping logic.

9. The method of claim 8, wherein the traffic-shaping logic determines a traffic-shaping delay.

10. The method of claim 9, wherein the traffic-shaping delay is calculated by subtracting a number of tokens in a token bucket for the first data flow from the size of an incoming packet and dividing this difference by the reserved rate.

11. The method of claim 9, further comprising dropping said incoming packet if the traffic-shaping delay exceeds a maximum shaping delay.

12. The method of claim 9, further comprising placing said packet in a queue for a period of time greater than or equal to its traffic-shaping delay.

13. The method of claim 1, wherein said network device interface is a router interface.

14. An apparatus for controlling data traffic for multiple data flows connected to a network device interface, the apparatus comprising:

one or more processors;

memory coupled to at least one of said one or more processors;

a reserved rate meter for each said flow, said reserved rate meter configured to track the use of reserved bandwidth associated with said data flow;

a peak rate meter for each said data flow, said peak rate meter configured to track the use of peak bandwidth associated with said data flow; and an interface meter configured to track the use of bandwidth of said network device interface;

wherein at least one said processor is configured or designed to adjust said meters based on the amount of data transmitted and refresh said meters based on the reserved and peak rates for each flow and the bandwidth for the network device interface.

15. The apparatus of claim 14 wherein a flow is allowed to transmit a packet provided said reserved rate meter indicates that said flow has not exceeded its reserved rate and either the peak rate meter indicates that the flow has not exceeded its peak rate or said interface meter shows available network device bandwidth.

16. The apparatus of claim 15 wherein said packet is dropped or delayed in a buffer if the reserved rate meter indicates the reserved rate has been exceeded and either the interface meter shows no remaining network device bandwidth or the peak rate meter shows the peak rate has been exceeded.

17. The apparatus of claim 16 wherein a traffic-shaping delay is calculated by subtracting the remaining reserved rate bandwidth from the packet size and dividing this number by the reserved rate for the associated flow.

18. The apparatus of claim 16 wherein a traffic-shaping delay is calculated by subtracting the remaining peak rate bandwidth from the packet size and dividing this number by the reserved rate for the associated flow.

19. The apparatus of claim 16 wherein said network device interface is a router interface.

20. An apparatus for controlling data traffic for multiple data flows at a network interface, the apparatus comprising:

one or more processors;

memory coupled to at least one of said one or more processors;

a reserved rate meter for each said flow, said meter configured to track the use of reserved bandwidth associated with said data flow;

a peak rate meter for each said data flow, said meter configured to track the use of peak bandwidth associated with said data flow; and an interface meter configured to track the use of bandwidth of said network device interface;

wherein at least one of said processors is configured or designed to determine whether to transmit data for said data flow depending on the interface meter level, the reserved rate meter level, and the peak rate meter level.

21. A method for controlling data traffic flow through a network device interface comprising:

providing an interface token bucket associated with said network device interface;

providing peak and reserved token buckets for each flow connected to said network device interface;

refreshing the interface, reserved, and peak token buckets based on the network device bandwidth and the peak and reserved rates for said flows; and subtracting the number of tokens equivalent to the size of a packet from the interface, peak, and reserved token buckets associated with a packet enqueued to output when the associated reserved token bucket is not empty or both the interface and associated peak token buckets are not empty.

22. An apparatus for supporting multiple data flows and controlling at least a first data traffic flow, the apparatus comprising:

a network device interface; and one or more processors designed or configured to determine how much bandwidth of the interface is being used, and how much bandwidth allotted to the first data flow is being used in comparison to a peak rate and a reserved rate, and depending on how much bandwidth of the interface is being used and on how much bandwidth of the first data flow is being used in comparison to its peak and reserved rates, determining whether to transmit data for the first flow.

23. The apparatus of claim 22, wherein said network device interface is a router interface.

24. The apparatus of claim 22, wherein the one or more processors determine how much bandwidth of the interface is being used by determining the bandwidth consumed by each of the multiple data flows.

25. The apparatus of claim 22, wherein the one or more processors allow the interface to transmit a packet for the first data flow provided said first data flow has not exceeded its reserved rate.

26. The apparatus of claim 22, wherein the one or more processors drop or delay transmission of a packet for first data flow if the first data flow has exceeded its reserved rate and either the first data flow has exceeded its peak rate or the interface has no available bandwidth.

27. The apparatus of claim 22, wherein if the one or more processors determine that data for the first flow should not be transmitted, providing the data for the first flow to traffic-shaping logic executed on the one or more processors.

28. The apparatus of claim 27, wherein the traffic-shaping logic determines a traffic-shaping delay.

29. A computer program product comprising a machine readable medium on which is provided program instructions for controlling data traffic flow through a network device interface supporting multiple data flows, the instructions encoding a method comprising:

determining how much bandwidth of the interface is being used;

for a first data flow through the interface, determining how much bandwidth allotted to the first flow is being used in comparison to a peak rate and a reserved rate for the first data flow; and depending on how much bandwidth of the interface is being used and on how much bandwidth of the first data flow is being used in comparison to its peak and reserved rates, determining whether to transmit data for the first flow.

30. The computer program product of claim 29, wherein instructions for determining how much bandwidth of the interface is being used comprise instructions for determining the bandwidth consumed by each of the multiple data flows.

31. The computer program product of claim 29, wherein instructions for determining how much bandwidth of the interface is being used include instructions for monitoring tokens representing available bits of data, which tokens are replenished with passing time and consumed by data flowing through the interface.

32. The computer program product of claim 29, wherein instructions for determining how much bandwidth allotted to the first flow is being used in comparison to the peak rate include instructions for monitoring tokens representing available bits of data, which tokens are replenished at the peak rate with passing time and consumed by data used for the first flow.

33. The computer program product of claim 29, wherein instructions for determining how much bandwidth allotted to the first flow is being used in comparison to the reserved rate includes instructions for monitoring tokens representing available bits of data, which tokens are replenished at the reserved rate with passing time and consumed by data used for the first flow.

34. The computer program product of claim 29, wherein the first data flow is allowed to transmit a packet provided said first data flow has not exceeded its reserved rate.

35. The computer program product of claim 29, wherein a packet for the first data flow is dropped or delayed in a buffer if said first data flow has exceeded its reserved rate and either the first data flow has exceeded its peak rate or the interface has no available bandwidth.

36. The computer program product of claim 29, wherein if it is determined that data for the first flow should not be transmitted, providing the data for the first flow to traffic-shaping logic.

37. The computer program product of claim 36, wherein the traffic-shaping logic determines a traffic-shaping delay.

38. An apparatus for controlling data traffic for multiple data flows connected to a network device interface, the apparatus comprising:

means for processing information about said multiple flows;

means for storing at least one of said data traffic and said information, wherein the means for storing is coupled to the means for processing;

means for metering a reserved rate for each said flow, said means for metering the reserved rate configured to track the use of reserved bandwidth associated with said data flow;

means for metering a peak rate for each said data flow, said means for metering the peak rate configured to track the use of peak bandwidth associated with said data flow; and for tracking the use of bandwidth of said network device interface;

wherein means for processing (i) adjusts the means for metering the reserved rate, the means for metering the peak rate, and the interface metering means based on the amount of data transmitted, (ii) refreshes said means for metering the reserved rate based on the reserved rate for each flow, (iii) refreshes the means for metering the peak rate based on the peak rate for each flow, and (iv) refreshes the interface metering means based on the bandwidth for the network device interface.

39. An apparatus for supporting multiple data flows, the apparatus comprising:

means for determining the amount of bandwidth being used at an interface;

means for determining the amount of bandwidth being used for a first data flow at the interface;

means for comparing the amount of bandwidth being used for the first data flow with a peak rate and a reserved rate associated with the first data flow; and means for determining whether to transmit data for the first data flow depending on the amount of bandwidth being used at the interface and the amount of bandwidth being used for the first data flow in comparison to the peak rate and the reserve rate.

* * * * *